US010956679B2

(12) United States Patent
Narayanan et al.

(10) Patent No.: US 10,956,679 B2
(45) Date of Patent: Mar. 23, 2021

(54) LINGUISTIC ANALYSIS OF DIFFERENCES IN PORTRAYAL OF MOVIE CHARACTERS

(71) Applicant: UNIVERSITY OF SOUTHERN CALIFORNIA, Los Angeles, CA (US)

(72) Inventors: Shrikanth Narayanan, Los Angeles, CA (US); Victor Martinez Palacios, Los Angeles, CA (US); Anil Ramakrishna, Los Angeles, CA (US); Krishna Somandepalli, Los Angeles, CA (US); Nikolaos Malandrakis, Los Angeles, CA (US); Karan Singla, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 79 days.

(21) Appl. No.: 16/137,091

(22) Filed: Sep. 20, 2018

(65) Prior Publication Data
US 2019/0087414 A1    Mar. 21, 2019

Related U.S. Application Data

(60) Provisional application No. 62/560,954, filed on Sep. 20, 2017.

(51) Int. Cl.
*G06F 40/30* (2020.01)
*G06F 17/18* (2006.01)
(Continued)

(52) U.S. Cl.
CPC ............ *G06F 40/30* (2020.01); *G06F 16/313* (2019.01); *G06F 16/353* (2019.01); *G06F 17/18* (2013.01); *G06F 40/169* (2020.01)

(58) Field of Classification Search
CPC ...... G06F 40/30; G06F 16/353; G06F 16/313; G06F 40/169; G06F 17/18
See application file for complete search history.

(56) References Cited

U.S. PATENT DOCUMENTS

| 9,978,359 B1* | 5/2018 | Kaszczuk | ............... G10L 13/02 |
| 10,180,939 B2* | 1/2019 | Nanavati | ............... G06T 11/206 |
| 2019/0043474 A1* | 2/2019 | Kingsbury | ............ G06F 40/117 |

OTHER PUBLICATIONS

Cohen, W.W. et al., "A Comparison of String Metrics for Matching Names and Records," In Kdd workshop on data cleaning and object consolidation, v. 3, 2003, pp. 73-78.
(Continued)

*Primary Examiner* — Abul K Azad
(74) *Attorney, Agent, or Firm* — Brooks Kushman P.C.

(57) ABSTRACT

A computer implemented method for analyzing media content includes a step of providing a plurality of narrative files formatted in human readable format. Each narrative file includes a script and/or dialogues tagged with character names along with auxiliary information. Each script includes a plurality of portrayals performed by an associated actor or character. Linguistic representations of content of the narrative files in both abstract and semantic forms is determined. The linguistic representations are connected to higher order representations and mental states. The linguistic representations are connected to behavior and action. Interplay between language constructs and demographics of content creators is analyzed. Content representations towards individuals/groups are adapted to reflect heterogeneity in preferences.

31 Claims, 9 Drawing Sheets

(51) Int. Cl.
  *G06F 16/31*    (2019.01)
  *G06F 16/35*    (2019.01)
  *G06F 40/169*   (2020.01)

(56) References Cited

OTHER PUBLICATIONS

Kiros, R. et al., "Skip-Thought Vectors," In Advances in Neural Information Processing Systems, 2013, (pp. 3294-3302).
Mikolov, T. et al., "Distributed Representations of Words and Phrases and their Compositionality," In Advances in neural information processing systems (pp. 3111-3119), downloaded Oct. 17, 2018 from https://apers.nips.cc/paper/5021-distributed-representations-of-words-and-phrases-and-their-compositionality.pdf.
Pennington, J. et al., "GloVe: Global Vectors for Word Representation," Proceedings of the 2014 Conference on Empirical Methods in Natural Language Processing (EMNLP), pp. 1532-1543, Oct. 25-29, 2014.

* cited by examiner

LINGUISTIC ANALYSIS OF DIFFERENCES IN PORTRAYAL OF MOVIE CHARACTERS

CROSS-REFERENCE TO RELATED APPLICATION

This application claims the benefit of U.S. provisional application Ser. No. 62/560,954 filed Sep. 20, 2017, the disclosure of which is incorporated in its entirety by reference herein.

STATEMENT REGARDING FEDERALLY SPONSORED RESEARCH OR DEVELOPMENT

The invention was made with Government support under Contract No. 1029373 awarded by the National Science Foundation. The Government has certain rights to the invention.

TECHNICAL FIELD

In at least one aspect, the present invention relates to method for analyzing movie content.

BACKGROUND

Movies are often described as having the power to influence individual beliefs and values. In (Cape, 2003), the authors assert movies' influence in both creating new thinking patterns in previously unexplored social phenomena, especially in children, as well as their ability to update an individual's existing social boundaries based on what is shown on screen as the "norm". Some authors claim the inverse: that movies reflect existing cultural values of the society, adding weight to their ability in influencing individual beliefs of what is accepted as the norm. As a result, they are studied in multiple disciplines to analyze their influence.

Movies are particularly scrutinized in aspects involving negative stereotyping (Cape, 2003; Dimnik and Felton, 2006; Ter Bogt et al., 2010; Hedley, 1994) since this may introduce questionable beliefs in viewers. Negative stereotyping is believed to impact society in multiple aspects such as self-induced undermining of ability (Davies et al., 2005) as well as causing forms of prejudice that can impact leadership or employment prospects (Eagly and Karau, 2002; Niven, 2006). Studies in analyzing stereotyping in movies typically rely on collecting manual annotations on a small set of movies on which hypotheses tests are conducted (Behm-Morawitz and Mastro, 2008; Benshoff and Griffin, 2011; Hooks, 2009).

Language use has been long known as a strong indicator of the speaker's psychological and emotional state (Gottschalk and Gleser, 1969) and is well studied in a number of applications such as automatic personality detection (Mairesse et al., 2007) and psychotherapy (Xiao et al., 2015; Pennebaker et al., 2003). Computational analysis of language has been particularly popular thanks to advancements in computing and the ease of conducting large scale analysis of text on computers (Pennebaker et al., 2015).

Previous works in studying representation in movies largely focus on relative frequencies, particularly on character gender. In (Smith et al., 2014), the authors studied 120 movies from around the globe which were manually annotated to capture information about character gender, age, careers, writer gender and director gender. However, since the annotations are done manually, collecting information on new movies is a laborious process.

Automated analyses of movies using computational techniques to analyze representation has recently gained some attention. In (NYFA, 2013; Polygraph, 2016), the authors examine differences in relative frequency of female characters and note considerable disparities in gender ratio in these movies. However, the analyses there are limited to comparing relative frequencies. In (Ramakrishna et al., 2015), the authors study difference in language used in movies across genders by a one-dimensional analysis.

Accordingly, there is a need for improved methods and systems for analyzing media content in an efficient scalable manner.

SUMMARY

In at least one aspect, the present invention solves one or more problems of the prior art by method for analyzing media content. The method includes a step of providing a plurality of narrative files formatted in human readable format. Each narrative file includes a script and/or dialogues tagged with character names along with auxiliary information. Each script includes a plurality of portrayals performed by an associated actor or character. Linguistic representations of content of the narrative files in both abstract and semantic forms is determined. The linguistic representations are connected to higher order mental states and higher order constructs. The linguistic representations are connected to behavior and action. Interplay between language constructs and demographics of content creators is analyzed. Content representations towards individuals/groups are adapted to reflect heterogeneity in preferences. Typically, a computer system is operable to perform at least one of or all of the steps of the method.

In another aspect, a large scale automated analyses of movie characters using language used in dialogs to study stereotyping along factors such as gender, race and age is provided.

In another aspect, laborious annotation is avoided by estimating the metadata computationally thereby enabling efficient scaling up.

In yet another aspect, fine grained comparisons of character portrayal is performed using multiple language-based metrics along factors such as gender, race and age on a newly created corpus.

In still another aspect, a movie screenplay corpus (sail.usc.edu/mica /text_corpus_release.php) is constructed that includes a plurality (e.g., nearly 1000 or more) of movie scripts obtained from the Internet or other source of such files. For each movie in the corpus, additional metadata such as cast, genre, writers and directors, and also collect actor level demographic information such as gender, race and age are obtained or assigned. Two kinds of measures are used in the analyses: (i) linguistic metrics that capture various psychological constructs and behaviors, estimated using dialogues from the screenplay; and (ii) graph theoretic metrics estimated from character network graphs, which are constructed to model inter-character interactions in the movie. The linguistic metrics include psycholinguistic normatives, which provide word level scores on a numeric scale which are then aggregated at the dialog level, and metrics from the Linguistic Inquiry and Word Counts tool (LIWC) which capture usage of well-studied stereotyping dimensions such as sexuality. Centrality metrics are estimated from the character network graphs to measure relative importance of the different characters, which are analyzed with respect to the different factors of gender, race and age.

Advantageously, embodiments and variations of the present invention provide: (i) a scalable analysis of differences in portrayal of various character subgroups in movies using their language use is presented, (ii) a new corpus with detailed annotations for the analysis is constructed and (iii) highlighting of several differences in the portrayal of characters along factors such as race, age and gender.

DETAILED DESCRIPTION

Figure 1A:
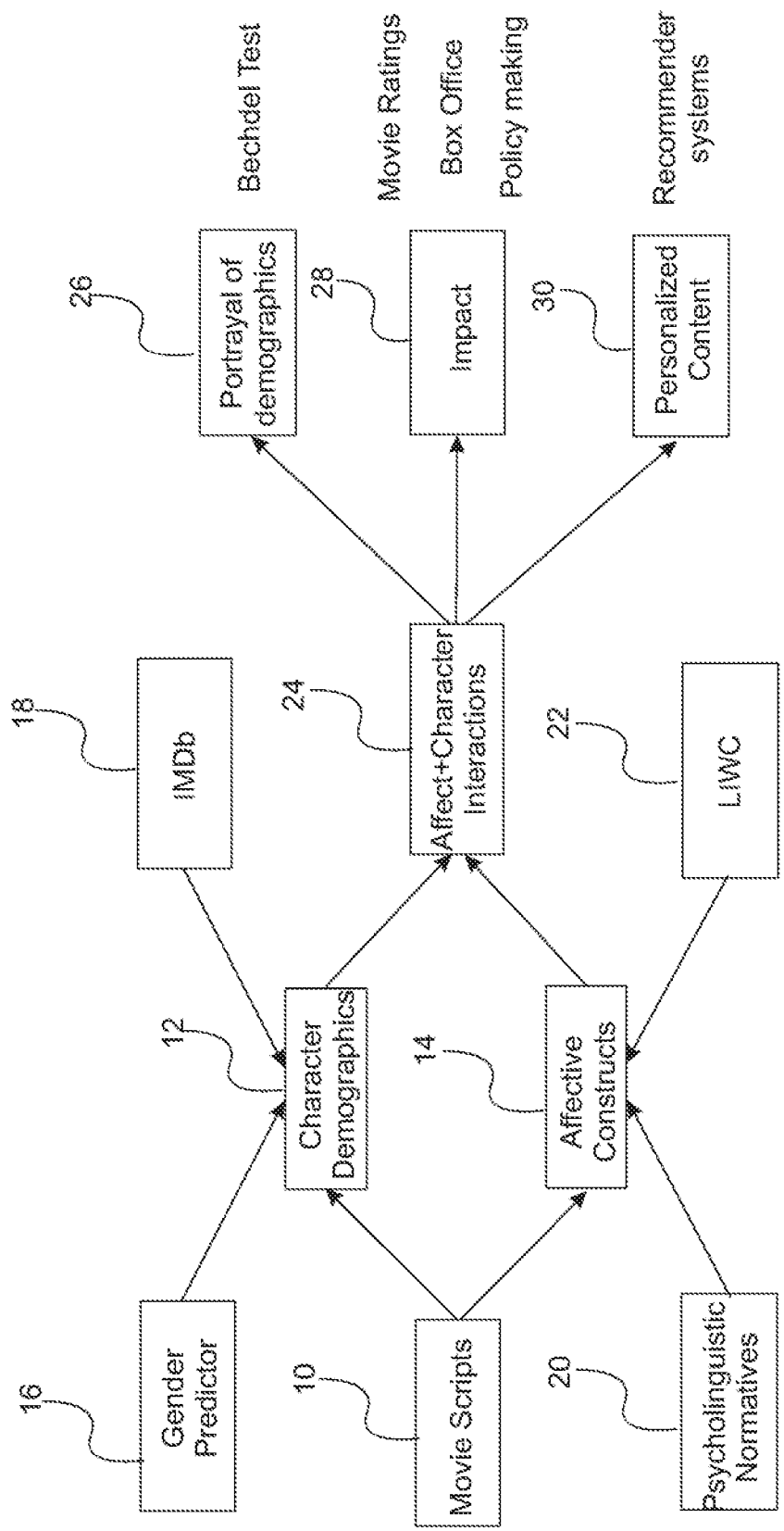
FIG. 1A: Linguistic representations used in some methods of the invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description are to be understood as modified by the word "about" in describing the broadest scope of the invention. Practice within the numerical limits stated is generally preferred.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Abbreviations:

"LIWC" "means linguistic inquiry and word counts.

"TFIDF" means term frequency-inverse document frequency.

The term "dimension" refers to the aforementioned social/physical constructs. For example, in prior published work we used dimensions such as sexuality, power among others, and the like.

In an embodiment, a method for analyzing media content is provided. Advantageously, the steps of the method are computer implemented by a computer having a computer processor operable to perform the steps of the method. The method includes a step of providing a plurality of narrative files formatted in human readable format. Examples of human readable formats include text files, word processor files (e.g., Word .doc files and .RTF files, PDF files, .txt files, and the like). The narrative files can be screenplay files or any story document with one or more characters, description of their actions, and a narrative that represents their interaction with one another. Each narrative file includes a script (e.g., a movie script) and dialogues tagged with character names along with auxiliary information. The terms "narrative file" and "script" as used herein will include movie scripts as well as any file that can be analyzed with the method set forth herein. In a variation, the auxiliary information includes, but is not limited to, shot location (interior/exterior), character placement and scene context. Characteristically, each script includes a plurality of portrayals performed by an associated actor. In a refinement, the narrative files are from a diverse set of writers and include a significant amount of noise and inconsistencies in their structure. Linguistic representations of content of the narrative files are determined. In a refinement, this representation is in both abstract and semantic forms (see, FIGS. 1A and 1B). In a refinement, the term "linguistic representations" refers to quantifying metrics which can be a number or sequence of numbers. The following papers describe semantic vector spaces in document analysis: [1] Mikolov, T., Sutskever, I., Chen, K., Corrado, G. S., & Dean, J. (2013). Distributed representations of words and phrases and their compositionality. In Advances in neural information processing systems (pp. 3111-3119). apers.nips.cc/paper/5021-distributed-representations-of-words-and-phrases-and-their-compositionality.pdf; [2] Pennington, J., Socher, R., & Manning, C. (2014). Glove: Global vectors for word representation. In Proceedings of the 2014 conference on empirical methods in natural language processing (EMNLP) (pp. 1532-1543). www.aclweb.org/anthology/D14-1162; and [3] Kiros, R., Zhu, Y., Salakhutdinov, R. R., Zemel, R., Urtasun, R., Torralba, A., & Fidler, S. (2015). Skip-thought vectors. In Advances in neural information processing systems (pp. 3294-3302). https://papers.nips.cc/paper/5950-skip-thought-vectors.pdf; the entire disclosures of which are hereby incorporated by reference. Word level representations include psycholinguistic normatives such as valence or association with specific constructs such as anger, sexuality, etc. In a refinement, "construct" refers to a metric and/or measure for quantifying or describing a number of defining attributes. These attributes may have a degree of subjectivity in their definition and quantification. In a refinement, normatives are numeric representations of expected content from a given stimulus such as word/image. Normatives constructed from sentences on psychological constructs such as emotion are called as psycholinguistic normatives. The linguistic representations are connected to higher order mental states and constructs (i.e., constructs including higher order dimensions). The linguistic representations are connected to behavior and action. Examples for the behavior and action include, but are not limited to, humor, violence, language sophistication, and combinations thereof. The interplay between language constructs and demographics of content creators is analyzed. For example, interplay will describe how the language trends between character demographics (e.g., gender, race, age) and their mental states, emotions, actions, and the like (e.g., females are happier). Content representations are adapted towards individuals/ groups to reflect heterogeneity in preferences. In a refinement, adapt means that the content representations as used to determine feature of the representation of individuals and/or groups and if there is diversity and/or heterogeneity in their representations. In a refinement, multiple levels connect words, emotion, and personality traits. In this context, "connect" means that construct representations can be constructed from lines in movies to various mental states and behaviors. For example, numeric measures of emotional dimensions such as valence (positive or negative connotation) and arousal (degree of activation) can be constructed. "Connects" can also be taken to mean "implies."

In a variation, the method further includes a step of parsing the screenplay or other narrative files to extract predetermined relevant information to output utterances and character names associated with the output utterances. Similar movies or stories are identified as a plurality of potential matches. Alignments (e.g., movie alignments) are formed by computing name alignment scores for each match as a percentage of character names from the screenplay or other narrative files for each of the similar movies or movies. In a refinement, character names are mapped by term frequency-inverse document frequency (TFIDF) to compute a name alignment score. Target entries are identified as movies or stories having an alignment score higher than a predetermined value. In a refinement, similar movies are identified that have a close match with a given screenplay or other narrative, manually if necessary. Demographics including age, gender, sex, education, profession, and race data are collected for each associated actor. Differences in portrayal of characters is determined along the linguistic representations. Portrayal differences can be measured by psycholinguistic normatives that capture an underlying emotional state of a speaker. In another refinement, biases in the portrayals are determined with respect to age, gender, and race. In a refinement, the alignments are manually corrected, to fix incorrect gender maps, and manually force a match if necessary.

In a variation, the method further includes a step of fetching metadata for each parsed movie or story. A particularly useful source for this metadata is IMDb.com. Examples of metadata include, but is not limited to year of release, directors, writers, producers, performers, and other creators of the content, and combinations thereof.

In another variation, a gender for actors and other members of a production team found in a movie or story are identified.

Psycholinguistic normatives can be used to provide a measure of emotional and psychological constructs of a speaker, the psycholinguistic normatives being computed entirely from language usage. Examples of emotional and psychological constructs include, but are not limited to arousal, valence, concreteness, and intelligibility. In a refinement, normative score for each of the psycholinguistic normatives is extrapolated from a small set of keywords which are annotated by psychologists, the normative score being computed on content words from each dialog. Normatives for an input word are numeric scores determined by linear regression as set forth below in more detail.

In a variation, the portrayal differences are measured by Linguistic Inquiry and Word Counts tool (LIWC) which provide a measure of a speaker's affinity to different predetermined social and physical constructs, processes raw text and outputs percentage of words from the script that belong to a predetermined dimension. The predetermined dimension includes a dimension selected from the group consisting of linguistic, affective, and perceptual constructs.

With reference to FIG. 1A, a variation of the linguistic representations used in some methods of the invention is provided. As depicted in Box 10, one or more scripts are obtained and then subjected to analysis to determine character demographics (Box 12) and affective constructs (Box 14). The character demographics is performed by applying a gender predictor (Box 16) and from metadata associated with a script obtained from a movie database such as IMDb (Box 18). Examples of such metadata include year of release, directors, writers, producers, performers, and other creators of the content, and combinations thereof. Affective constructs (e.g., related to emotions) are formed by applying psycholinguistic normatives (Box 20) and LIWC metrics (Box 22). The character demographics and affective constructs are collectively combined to determine affect and character interaction metrics (Box 24). These affect/character interaction metrics can in turn be used for evaluating character portrayal (Box 26, e.g., the Bechdel Test for evaluating the portrayal of women in movies). The affect/ character interaction metrics can also be used to determining or predict impact of a movie (Box 28). The affect/character interaction metrics can also be used to provide personalized content (Box 30). For example, a recommender system can be used to suggest content to a user.

Figure 1B:
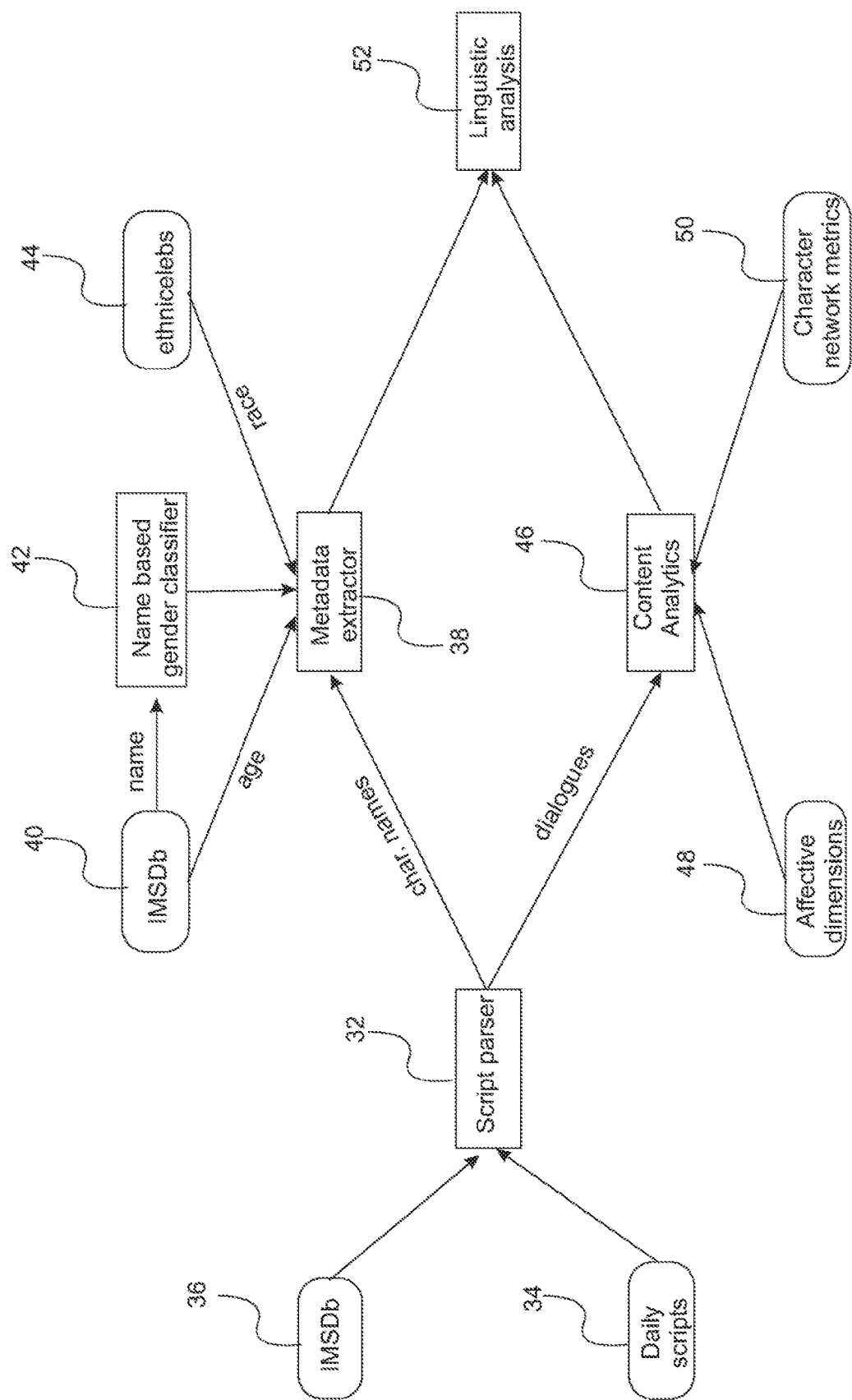
FIG. 1B: Linguistic representations used in some methods of the invention.

With reference to FIG. 1B, a variation of the linguistic representations used in some methods of the invention is provided. As depicted in Box 32, a script parser acts on a script (Box 34) and data from a movie database (Box 36), The script parser outputs character names and dialogues. The script parser act on the extracted character names (Box 38). The script parser determines a character's age from a script database (Box 40). A name-based gender classifier (Box 42) can be used to determine gender from the character name. In a refinement, the name-base classifier used metadata from a script database as set forth above. A race for a character can be assigned for example from knowledge of the actor's race or the intended race of the character (Box 44). The dialogues extracted from the script parser are then process as indicted in box 46 by a content analytic module which determines affective dimensions (Box 48) (e.g., parameters that describe emotion optionally with a creating a scale for quantification) and character network metrics (Box 50) (e.g., centrality as set forth below in more detail). The output from the metadata extractor and the content analytic module are then subjected to be operated on by a linguist analyzer which connect the linguistic representations to higher order representations and mental states and representations of behavior and action, analyzes interplay between language constructs and demographics of content creators and adapts content representations towards individuals/groups to reflect heterogeneity in preferences.

Figure 2:
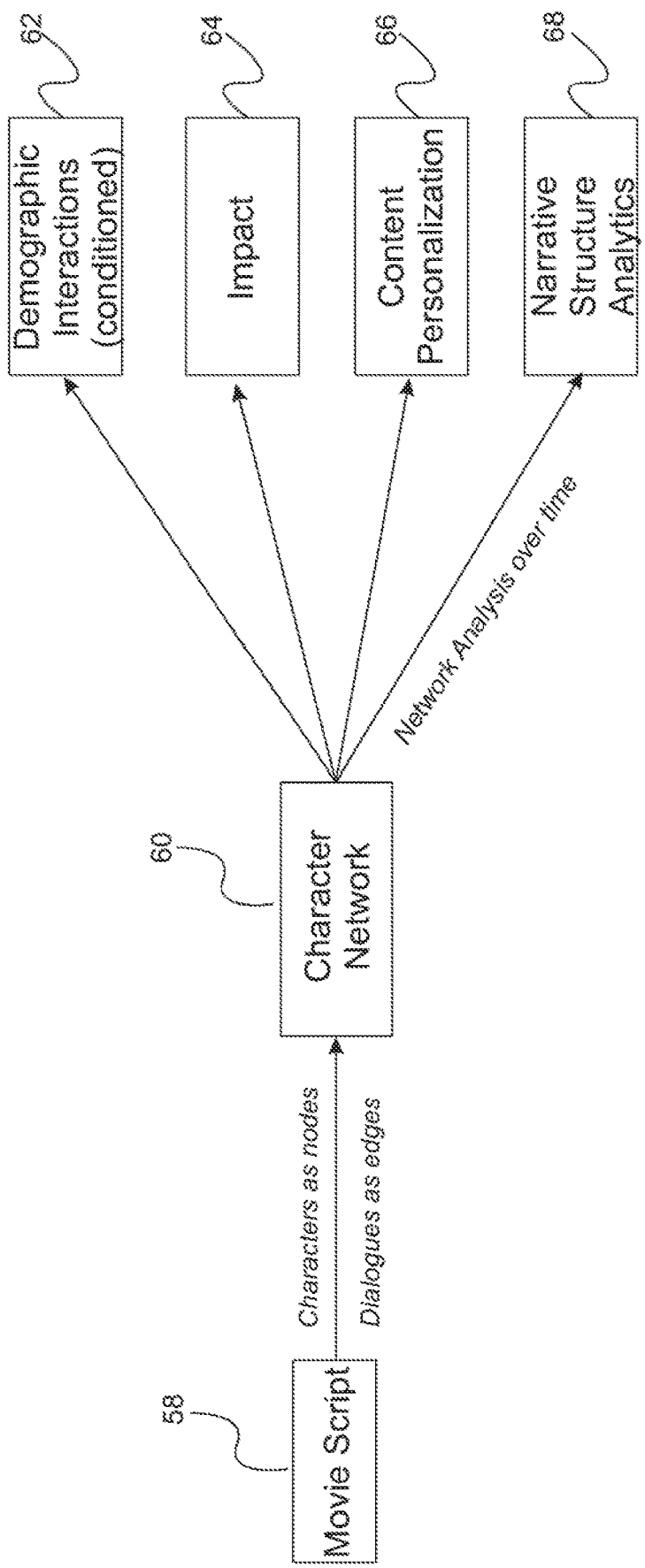
FIG. 2: Character networks as used in some methods of the invention.

In another variation, a network structure of interactions between characters is constructed using importance measures for each character (see, FIG. 2). A script (Box 58) is used to form a network structure (e.g., a graph). In box 60, the network structure is formed by constructing an undirected and unweighted graph where nodes represent characters, placing an edge $e_{ab}$ to represent interactions between two characters in terms of quality and quantity, and analyzing properties of a node and/or edge statically or over time. The taxonomy of media content is determined using character temporal and global network structures. In a general, taxonomy refers to the classification (i.e., type of script or movie) of the media content, e.g., genre such as action movie, drama, SciFi, and the like. In particular, the network structures can be used to determine demographic interactions (conditioned) (Box 62), impact (Box 64), content personalization (Box 66), and/or narrative structure analytics (Box 68). In a variation, user personalizations such as online recommendation systems can be determined from the network structure. Personalizations can further be determined from using networks conditioned on demographics.

In a refinement, an edge $e_{ab}$ can be placed if two characters A and B interact at least once in the script wherein characters A and B interacts at least one scene in which one speaks right after another. In this regard, betweenness centrality can be employed where "betweenness" centrality is the number of shortest paths that go through a node. In a further refinement, degree centrality is employed, degree centrality being the number of edges incident on a node.

In a refinement, the quantity of access interactions between characters determines weight of an edge as number of dialogues, words exchanged, and other nonverbal cues exchanged. In another refinement, the quality of access interactions between characters determines the weight of an edge from linguistic representations. For example, if the edges are weighted using valence higher edge weights indicate more positive character interactions. The quality of access interactions between characters can also be determined using weight of an edge from interactions is conditioned on predetermined features such as demographics, education level, and combinations thereof. In a refinement, the effects of addition, deletion, and/or substitution of nodes and/or edges in disrupting a movie or story plot can be evaluated. Measures of a node's importance as proxy for a character's importance can also be estimated (see, FIG. 3). In this regard, adding/deleting a new node amounts to adding or deleting a character in the plot and hence can be evaluated subjectively by observing the impact on the storyline. Node importance is estimated using predefined and established metrics from graph theory.

Figure 3:
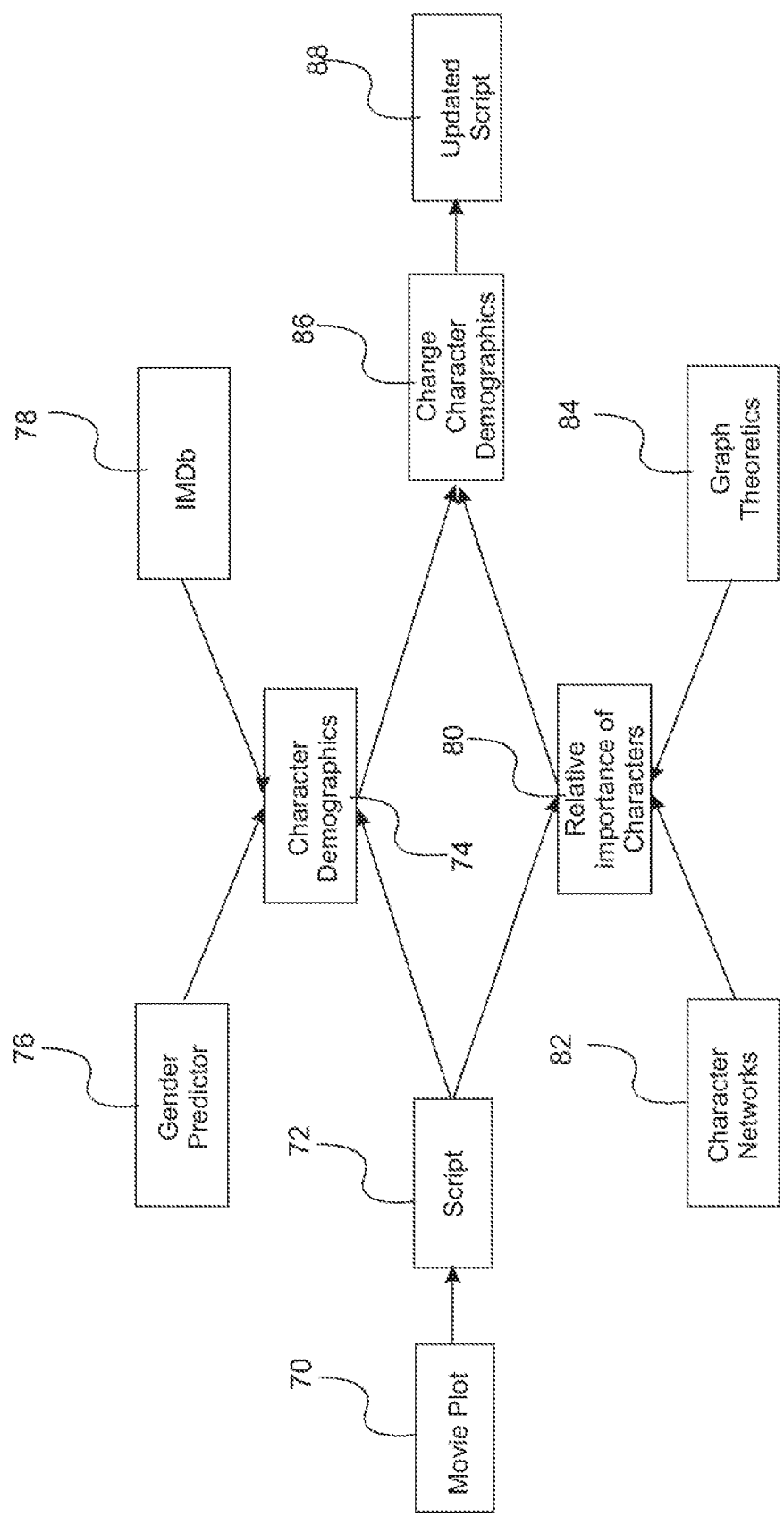
FIG. 3: Synthesis as used in some methods of the invention.

FIG. 3 illustrates the incorporation of the graph in performing the linguistic analysis. A plot (Box 70) is incorporated into a script (Box 72). This script is then subjected to two analyses—character demographic analysis (Box 74) and determination of the relative importance of the characters (Box 80). The character demographics can be determined from a gender predictor (Box 76) and from data obtained from a script database (Box 78) as set forth above. The metrics obtained from box 76 and box 80 can then be used to change character demographics (Box 82) and to update the script (Box 84) to meet a predetermined or desired policy.

In a variation, a taxonomy of media content is determined from the network structure conditioned on demographics.

In each of the methods set forth above, societal impact, commercial impact, policy impact, voting impact, buying impact, and combinations thereof can be determined and evaluated. For example, structure and demographics of narratives in movies or adverts may be related to box office or product sales. Structure of political narratives may be related to outcome of elections. In a particularly important application, conscious or subconscious biases that may have been introduced in the screenplay writing process are corrected by the methods set forth herein. For example, there may be deviations in representations of demographics such as gender and race in comparison with general population which may be corrected before/during the casting process using the methods and computer system set forth herein. Another application is connecting representations to impact; for example, the average user rating or box office collections of a movie maybe correlated to specific representations and portrayals in the movie. This may in turn be useful—for a content producer for example—to automatically filter movies that deviate substantially from known representation profiles.

Figure 4:
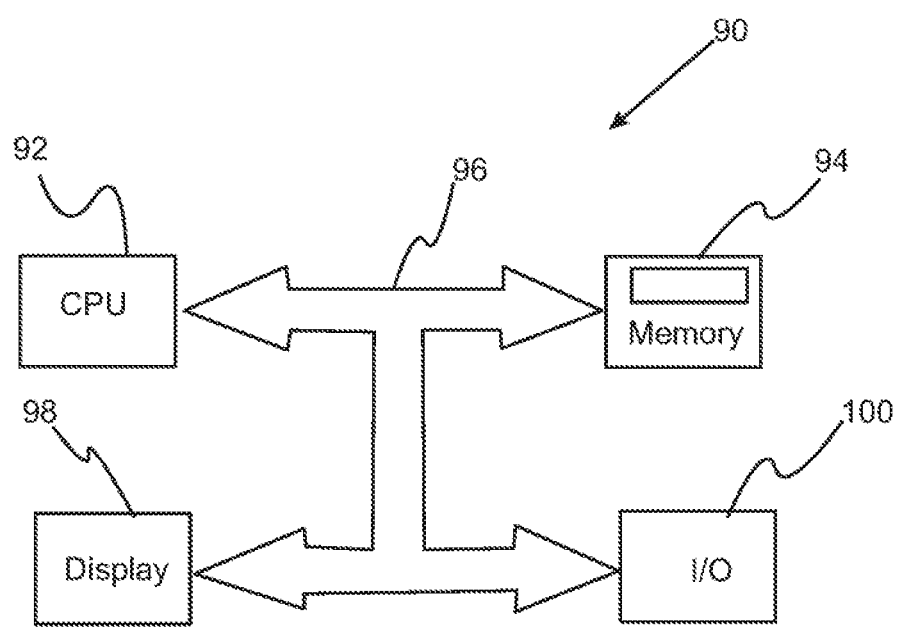
FIG. 4: a schematic illustration of a computer system implementing the methods set forth above.
Figure 5A:
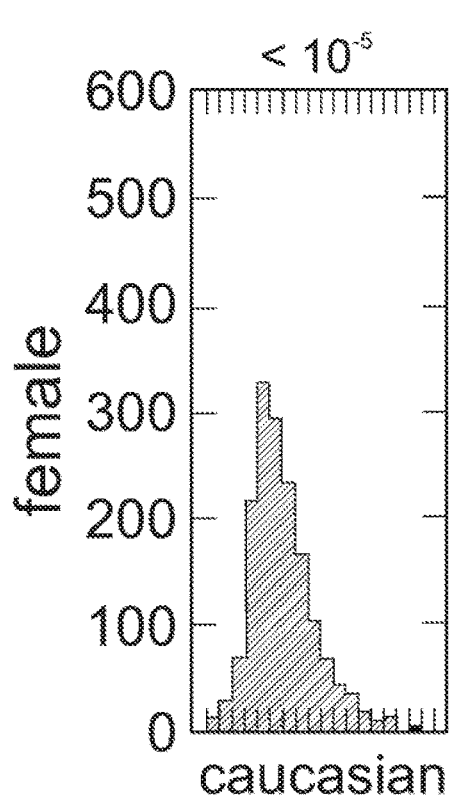
FIGS. 5A, 5B, 5C, 5D, 5E, 5F, 5G, 5H, 5I, 5J, 5K, 5L, 5M, 5N, 5O, and 5P: Histogram of age for actors belonging to different gender and racial categories with p-values on top; significant values at $\alpha=0.05$ are highlighted; *: no test performed since the female group is empty.
Figure 5B:
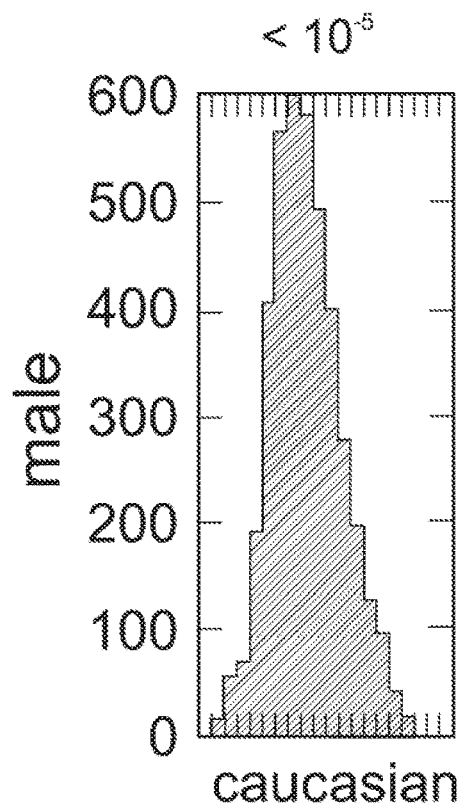
Figure 5C:
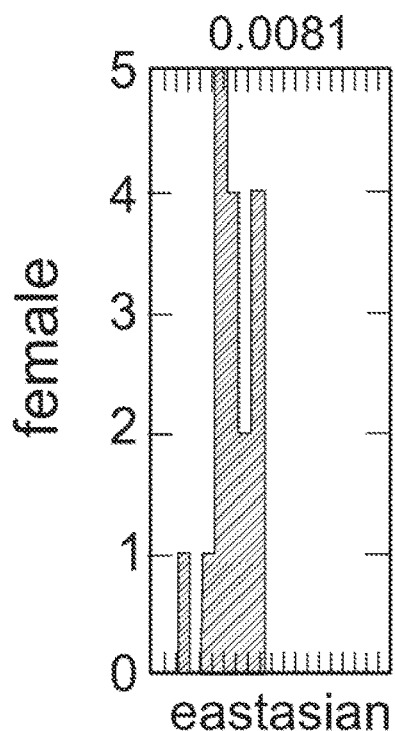
Figure 5D:
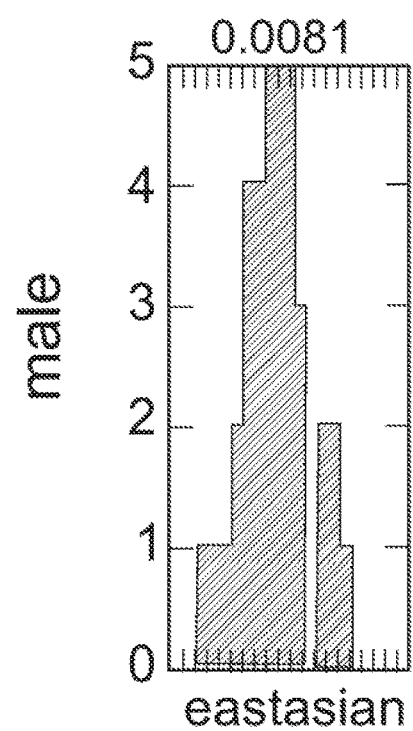
Figure 5E:
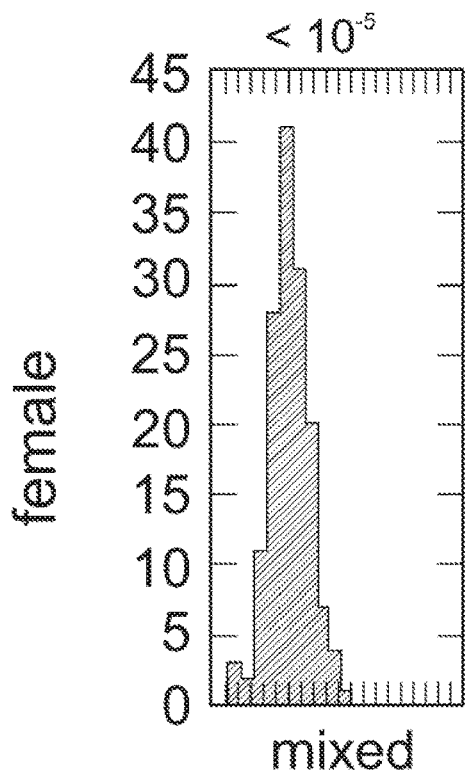
Figure 5F:
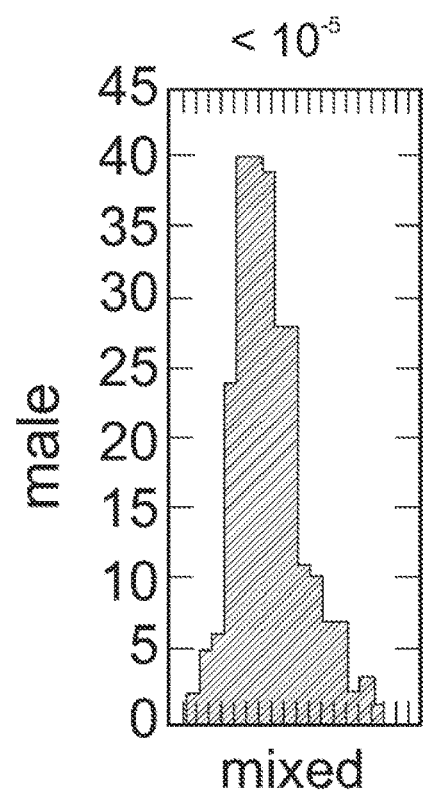
Figure 5G:
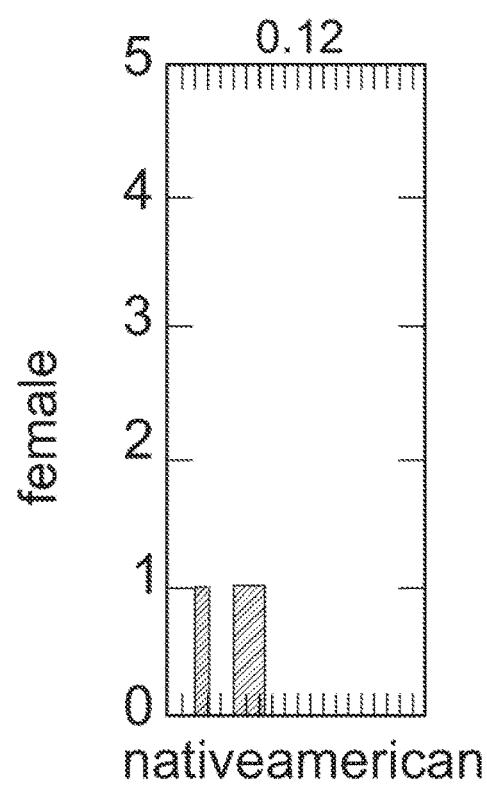
Figure 5H:
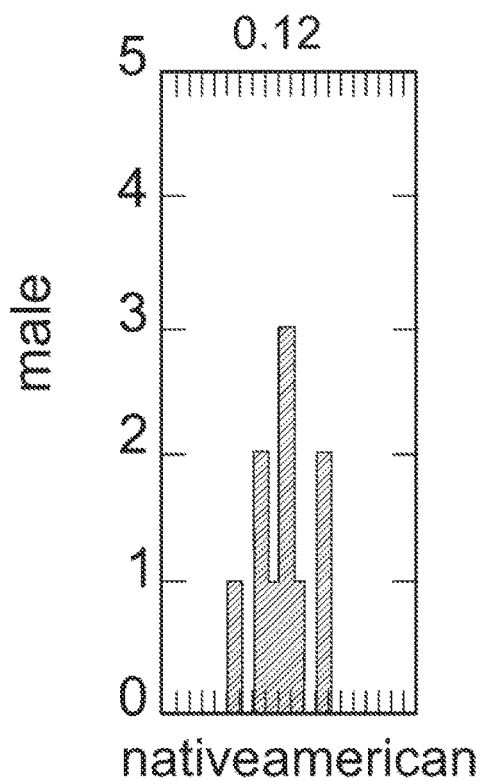
Figure 5I:
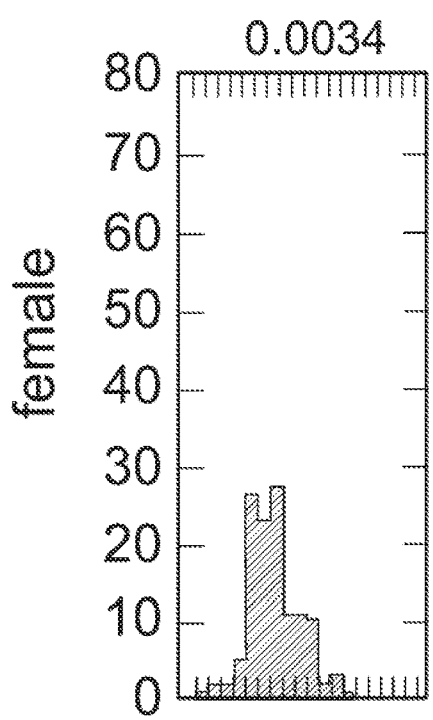
Figure 5J:
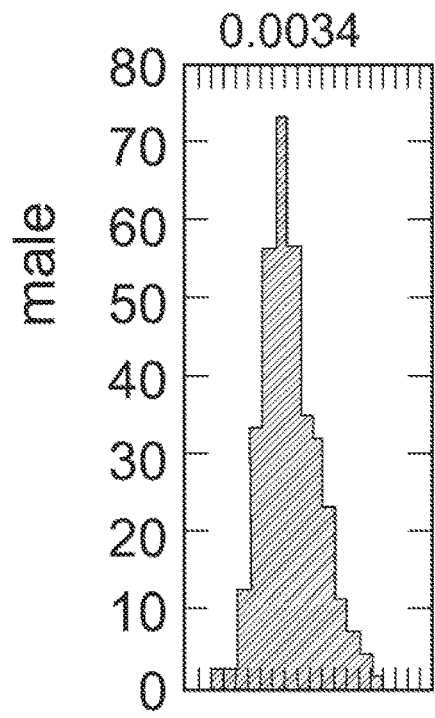
Figure 5K:
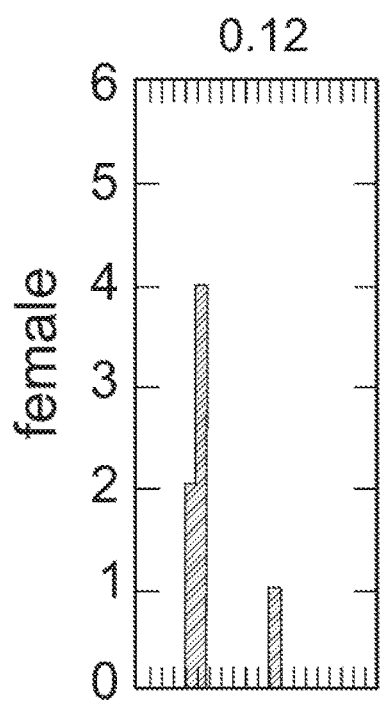
Figure 5L:
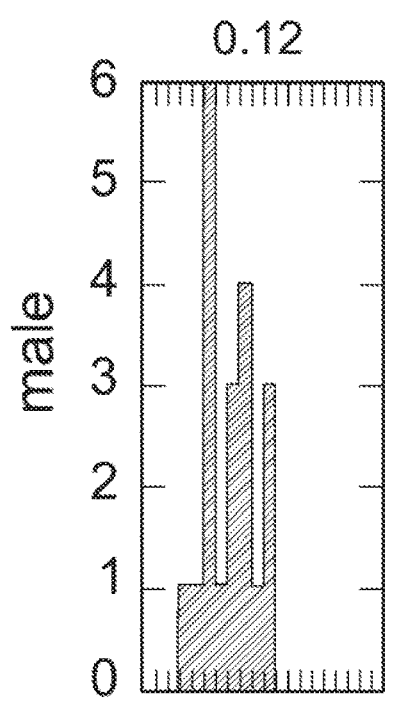
Figures 5M, 5N, 5O, 5P:
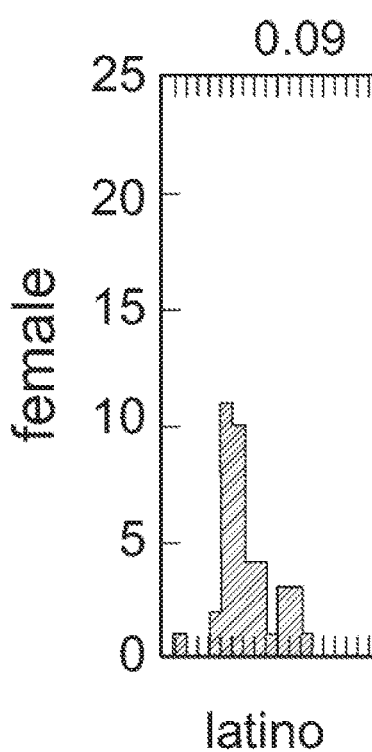

With reference to FIG. 4, a schematic illustration of a computer system implementing the methods set forth above is provided. Computer system 90 includes computer processor 92 (e.g., microprocessor) that executes one, several, or all of the steps of the method. It should be appreciated that virtually any type of computer processor may be used, including microprocessors, multicore processors, and the like. The steps of the method typically are stored in computer memory 94 and accessed by computer processor 92 via connection system 96. In a variation, connection system 96 includes a data bus. In a refinement, computer memory 94 includes a computer-readable medium which can be any non-transitory (e.g., tangible) medium that participates in providing data that may be read by a computer. Specific examples for computer memory 94 include, but are not limited to, random access memory (RAM), read only memory (ROM), hard drives, optical drives, removable media (e.g. compact disks (CDs), DVD, flash drives, memory cards, etc.), and the like, and combinations thereof. In another refinement, computer processor 92 receives instructions from computer memory 94 and executes these instructions, thereby performing one or more processes, including one or more of the processes described herein. Computer-executable instructions may be compiled or interpreted from computer programs created using a variety of programming languages and/or technologies including, without limitation, and either alone or in combination, Java, C, C++, C#, Fortran, Pascal, Visual Basic, Java Script, Perl, PL/SQL, etc. Display 98 is also in communication with computer processor 92 via connection system 96. Electronic device 90 also optionally includes various in/out ports 100 through which data from a pointing device may be accessed by computer processor 92. Examples for the electronic devices include, but are not limited to, desktop computers, smart phones, tablets, or tablet computers. In a refinement, neural networks can be used to perform the methods set forth above.

The following examples illustrate the various embodiments of the present invention. Those skilled in the art will recognize many variations that are within the spirit of the present invention and scope of the claims.

Data

Raw Screenplay

Movie screenplay files were fetched from two primary sources: imsdb (IMSDb, 2017) and daily scripts (DailyScript, 2017). In total, 1547 movies were retrieved. After removing duplicates, 1434 raw screenplay files were retained, of which 489 were corrupted or empty leaving us with 945 usable screenplays. Tables 1, 2, and 3 list statistics about the corpus.

Script Parser

The screenplay files are formatted in human readable format and include dialogues tagged with character names along with auxiliary information of the scene such as shot location (interior/exterior), character placement and scene context. The screenplays are from a diverse set of writers and include a significant amount of noise and inconsistencies in their structure. To extract the relevant information, a text parser (bitbucket.org/anil_ramakrishna/scriptparser) was developed that accepts raw script files and outputs utterances along with character names. Scene context information is ignored and primarily focus on spoken dialogues to study language usage in the movies.

Movie and Character Meta-Data

For each parsed movie, relevant meta-data such as year of release, directors, writers, and producers is fetched from the Internet Movie Database (IMDb, 2017).

Since most screenplays are drafts and subject to revisions such as changes in character names, matching them to an entry from IMDb is non-trivial. The process commences with a list of all movies that have a close match with the screenplay name; given this list of potential matches, name alignment scores are computed for each entry as the percentage of character names from the script found online. The character names are mapped using term frequency-inverse document frequency (TFIDF) to compute the name alignment score following (Cohen et al., 2003, the entire disclosure of which is hereby incorporated by reference). Finally, the entry with highest alignment score is chosen. For all actors listed in the aligned result, their age, gender and race are collected as detailed below.

Gender

Given the names of actors and other members of production team found in a movie, a name-based gender classifier is used to predict their gender information. Table 4 lists statistics on gender ratios for the production team in the corpus. Female-to-male ratios were found in close agreement with previous works (Smith et al., 2014).

As mentioned above, several screenplays get revised during production. In particular, character names get changed, sometimes even gender. As a result, some characters may not be aligned to the correct entry from IMDb. In addition, digitized screenplays sometime include significant noise thanks to optical character recognition errors, leading to character names failing to align with entries from IMDb. To correct these, manual cleanup of all the movie alignments, fix incorrect gender maps, and manually force match movies if they're mapped to the wrong IMDb entry is performed.

Age

The age for each actor is extracted to study possible age-related biases in movies. Age is included in the analysis since studies report preferential biases with age in employment particularly when combined with gender (Lincoln and Allen, 2004). In addition, there may be biases in portrayal of specific age groups when combined with gender and race.

For each actor in the mapped IMDb entry, his/her birthday information is also collected. The movie production year obtained also from IMDb is subtracted from the actor's birthday to get an estimate of the actor's age during the movie's production. However, it is noted that the age obtained in this manner may be different from the portrayed age of the character. To account for this, the actors are binned into fifteen-year age groups before the analysis, since its generally unlikely to have actors further than fifteen years from their portrayed age.

Race

Ethnicity information is parsed from the website (ethnicelebs.com, 2017), which includes ethnicity for approximately 8000 different actors. The information obtained from this site is primarily submitted by independent users and exhibits significant amount of variation among the possible ethnicities with about 750 different unique ethnicity types. Since racial representations are more interesting, the ethnicity types is mapped to race using Amazon Mechanical Turk (MTurk). A modified version of the racial categories from the US census which are listed in Table 1 along with frequency of actors from each racial category in the corpus is used.

The ethnicities obtained from the site above primarily cover major actors with a fan base with no information for several actors who play minor roles. Racial information for nearly 2000 such actors is annotated using MTurk with two annotations for each actor, manually correcting nearly 400 cases in which the annotators disagreed.

TABLE 1

Racial categories

| Race | # Actors | Percentage |
| --- | --- | --- |
| African | 585 | 7.44% |
| Caucasian | 6539 | 83.24% |
| East Asian | 73 | 0.93% |
| Latino/Hispanic | 161 | 2.05% |
| Native American | 15 | 0.19% |
| Pacific Islander | 5 | 0.063% |
| South Asian | 43 | 0.547% |
| Mixed | 434 | 5.52% |

Experiments

Character Portrayal Using Language

To study differences in portrayal of characters, two different metrics were used: psycholinguistic normatives, which are designed to capture the underlying emotional state of the speaker; and LIWC metrics, which provide a measure of the speaker's affinity to different social and physical constructs such as religion and death. These two metrics are explained in detail below.

Psycholinguistic Normatives

Psycholinguistic normatives provide a measure of various emotional and psychological constructs of the speaker, such as arousal, valence, concreteness, intelligibility, etc. and are computed entirely from language usage. They are relatively easy to compute, provide reliable indicators of the above constructs, and have been used in a variety of tasks in natural language processing such as information retrieval (Tanaka et al., 2013), sentiment analysis (Nielsen, 2011), text-based personality prediction (Mairesse et al., 2007) and opinion mining.

The numeric ratings are typically extrapolated from a small set of keywords which are annotated by psychologists. Manual annotations of word ratings are a laborious process and is hence limited to a few thousand words (Clark and Paivio, 2004). Automatic extrapolation of these ratings to words not covered by the manual annotations can be done using structured databases which provide relationships between words such as synonymy and hyponymy (Liu et al., 2014), or using context based semantic similarity.

In the analysis set forth below, the model described in (Malandrakis and Narayanan, 2015) is applied. In this model, the authors use linear regression to compute normative scores for an input word w based on its similarity to a set of concept words $S_i$.

$$r(w) = \theta_0 + \sum_i \theta_i \cdot sim(w, s_i)$$

where, r(w) is the computed normative score for word w, $\theta_0$ and $\theta_i$ are regression coefficients and sim is similarity between the given word w and concept words $s_i$.

The concept words can either be hand crafted suitably for the domain or chosen automatically from data. Similar to (Malandrakis and Narayanan, 2015), training data was created by posing queries on the Yahoo search engine from words of the aspell spell checker of which top 500 previews are collected from each query. From this corpus, the top 10000 most frequent words with at least 3 characters were used as concept words in extrapolation of all the norms. The linear regression model is trained using normative ratings for the manually annotated words by computing their similarity to the concept words. The similarity function sim is the cosine of binary context vectors with window size 1. The computed normatives are in the range [−1,1].

The psycholinguistic normatives used in the experiments set forth herein are listed in Table 2. Valence is the degree of positive or negative emotion evoked by the word. Arousal is a measure of excitement in the speaker. Valence and arousal combined are common indicators used to map emotions. Age of Acquisition refers to the average age at which the word is learned, and it denotes sophistication of language use. Gender Ladenness is a measure of masculine or feminine association of a word. 10-fold Cross Validation tests are performed on the normative scores predicted by the regression model given by equation 1. Correlation coefficients of the selected normatives with the manual annotations are as follows: Arousal (0.7), Valence (0.88), Age of Acquisition (0.86) and Gender Ladenness (0.8). The high correlations render confidence in the psycholinguistic models.

In the experiments set forth below, the normative scores are computed on content words from each dialog. All words other than nouns, verbs, adjectives and adverbs were filtered out. Word level scores are aggregated at the dialog level using arithmetic mean.

Linguistic Inquiry and Word Counts (LIWC)

LIWC is a text processing application that processes raw text and outputs percentage of words from the text that belong to linguistic, affective, perceptual and other dimensions. It operates by maintaining a diverse set of dictionaries of words each belonging to a unique dimension. Input texts are processed word by word; each word is searched in the internal dictionaries and the corresponding counter is incremented if a word is found in that dictionary. Finally, percentage of words from the input text belonging to the different dimensions are returned.

For the experiments, each utterance in the movie is treated as a unique document for which values for the LIWC metrics are obtained. Table 2 lists the metrics used in the experiments.

Character Network Analytics

In order to study representation of the different subgroups as major characters in movies, a network of interaction between characters is constructed using computed importance measures for each character. From each movie script, an undirected and unweighted graph is constructed where nodes represent characters. An edge $e_{ab}$ is placed iff two characters A and B interact at least once in the movie. For the experiments, interaction between A and B was assumed if there is at least one scene in which one speaks right after another. This graph creation method based on scene co-occurrence is similar to the approach used in (Beveridge and Shan, 2016). Different measures of a node's importance within the character network were estimated and used as proxy for the character's importance. Two types of centralities were employed: betweenness centrality which is the number of shortest paths that go through the node, and degree centrality, which is the number of edges incident on a node. These centrality measurements have been previously used in the context of books, films and comics (Beveridge and Shan, 2016; Bonato et al., 2016; Alberich et al., 2002; Ribeiro et al., 2016).

Results

Differences in various subgroups along multiple facets were studied. Results on differences in character ratios from each subgroup are reported first since this has implications on employment and can have social-economic effects (Niven, 2006). Next, psycholinguistic normatives and LIWC metrics described in the previous section are used to study differences in character portrayal along the primary markers: age, gender and race. Finally, the graph theoretic centrality measures is used to estimate characters' importance and analyze differences among the different subgroups.

Since there is an interest in character level analytics, all utterances from the character are treated as a single document to compute the aggregate language metrics. All of the experiments were performed using non-parametric statistical tests since the data fails to satisfy preconditions such as normality and homoscedasticity required for parametric tests such as ANOVA.

TABLE 2

Psycholinguistic Normatives and LIWC metrics used in analysis

| | |
|---|---|
| Psycholinguistic norms | Valence, Arousal, Age of Acquisition, Gender Ladenness |
| LIWC metrics | Achievement, Religion, Death, Sexual, Swear |

TABLE 3

Character statistics

| | male | female | total |
|---|---|---|---|
| # Characters | 4899 | 2008 | 6907 |
| # Dialogues | 375711 | 154897 | 530608 |
| | 945 | | |

TABLE 4

Production team statistics

| role | male | female | total |
|---|---|---|---|
| Writers | 1326 | 169 | 1495 |
| Directors | 544 | 46 | 590 |
| Producers | 2866 | 870 | 3736 |
| Casting Directors | 135 | 275 | 410 |
| Distributing Companies | | | 2701 |

TABLE 5

Contingency tables for character gender v/s writers, directors and casting directors' gender; f: female and m: male; each cell gives frequency of character gender for that column and production member gender for that row, numbers in braces indicate row wise proportion of character gender.

| | f (28.9%) | m (71.1%) |
|---|---|---|
| a. writers gender | | |
| f | 249 (41.2%) | 356 (58.8%) |
| m | 1541 (27.6%) | 4040 (72.4%) |

TABLE 5-continued

Contingency tables for character gender v/s writers,
directors and casting directors' gender; f: female
and m: male; each cell gives frequency of character
gender for that column and production member gender for
that row, numbers in braces indicate row wise proportion
of character gender.

|   | f (28.9%) | m (71.1%) |
| --- | --- | --- |
|   | b. directors gender | |
| f | 114 (39.3%) | 176 (60.7%) |
| m | 1676 (28.4%) | 4220 (71.6%) |
|   | c. casting directors gender | |
| f | 1374 (29.1%) | 3350 (70.9%) |
| m | 416 (28.5%) | 1046 (71.5%) |

Difference in Relative Frequency of Subgroups

First, characters were filtered with unknown gender/race/age leaving us with 6907 characters in total. Table 3 lists the number of characters and dialogues from each gender. As noted in previous studies, the ratio is considerably skewed with male actors having nearly twice as many roles and dialogues compared to female actors. Table 4 lists relative frequency among male and female members of the production team. Table 1 lists the percentage of actors belonging to different racial categories in the corpus.

Chi-squared tests were performed between character gender and gender of production team members who are most likely to influence characters gender: writers, directors and casting directors. Table 5 shows contingency tables with gender frequencies for each of these cases along with percentages. Note, nearly 100 movies were filtered out for this test in which the gender of the production team members was unknown. Of the three tests performed, character gender distributions for writer and director genders are significantly different from the overall character gender distribution ($p<10^{-10}$ and $p<10^{-4}$ respectively; $\alpha=0.05$). In particular, female writers and directors appear to produce movies with relatively balanced gender proportions (still slightly skewed towards the male side) compared to male writers and directors. Casting directors however appear to have no influence on gender of the characters.

Studies report potential biases in actor employment with age (Lincoln and Allen, 2004), particularly in female actors. To evaluate this, histograms of age for male and female characters for each of the racial categories in FIG. 5 are plotted. The distribution of age for each category appears approximately normal, except for the Native American and pacific islander character groups which have a small sample size. For most categories of race, the mode of the distribution for female actors appears to be at least five years less than the mode for male actors. To check for significance in this difference, Mann-Whitney U tests were conducted on male and female age groups for each race with the resulting p-values shown in the figure. Characters belonging to the pacific islander racial group were ignored since there are no female actors from this race in the corpus. The difference in age groups is significant in most categories with large sample sizes, suggesting possible preferences towards casting younger people when casting female actors.

Character Portrayal Using Language

To analyze differences in portrayal of subgroups, psycholinguistic normatives and LIWC metrics are computed as described before. For each of the metrics listed in Table 2, non-parametric hypothesis tests are conducted to look for differences in samples from the subgroups. The different metrics are treated independently, performing statistical tests along each separately. Statistical tests combining two or more factors was avoided since some of the resulting groups would be empty due to the skewed group sizes along race.

TABLE 6

Median values for male and female characters along with
p values obtained by comparing the two groups using
Mann-Whitney U test; highlighted differences are
significant at $\alpha = 0.05$.

|   | m (4894) | f (2008) | p |
| --- | --- | --- | --- |
| age of acq. | −0.1590 | −0.1715 | $<10^{-5}$ |
| arousal | 0.0253 | 0.0246 | 0.41 |
| gender | −0.0312 | −0.0055 | $<10^{-5}$ |
| valence | 0.2284 | 0.2421 | $<10^{-5}$ |
| sex | 0.00015 | 0.0000 | 0.08 |
| achieve | 0.0087 | 0.0080 | $<10^{-5}$ |
| religion | 0.0025 | 0.0022 | 0.10 |
| death | 0.0025 | 0.0016 | $<10^{-5}$ |
| swear | 0.0037 | 0.0015 | $<10^{-5}$ |

Gender

Mann-Whitney U tests was performed between male and female characters along the nine dimensions and the results are shown in Table 6. In all of the cases, higher values imply higher degree of the corresponding dimension, except for valence in which higher values imply positive valence (attractiveness) and lower values imply negative valence (averseness). The difference between male and female characters are statistically significant along six of the nine dimensions. The results indicate slightly higher age of acquisition scores for male characters. Regarding gender ladenness, male characters appear to be closer to the masculine side than female characters on average, agreeing with previous results.

The results also indicate that female character utterances tend to be more positive in valence compared to male characters while male characters seem to have higher percentage of words related to achievement. In addition, male characters appear to be more frequent in using words related to death as well as swear words compared to female characters.

Race

To study differences in portrayal of the racial categories, a Kruskal-Wallis test (a generalization of Mann-Whitney U test for more than two groups) was performed on each of the nine metrics with race as the independent variable. Significant differences were found in distribution of samples for gender ladenness, sexuality, religion and swear words. For gender ladenness, Caucasian and mixed-race characters have significantly higher medians than African and Native American characters. In sexuality, Latino and mixed-race characters were found to have higher median than at least one other racial group with significance indicating a higher degree of sexualization in these characters. East Asian characters were found to be significantly lower than medians of three other races (Caucasian, African and mixed) in using words with religious connotations. In swear word usage, the only significant difference found is between Caucasian and African characters with African characters using higher percentage of swear words. In all of the above cases, significance was tested at $\alpha=0.05$

TABLE 7

Coefficients of age for linear regression models along each dimension along with p-values; highlighted cells are significant at $\alpha = 0.05$

|  | $\beta_1 (\times 10^{-3})$ | p-value |
|---|---|---|
| age of acq. | 3.9 | $<10^{-10}$ |
| arousal | −1.1 | $<10^{-10}$ |
| gender | −2.5 | $<10^{-10}$ |
| valence | 0.078 | 0.7 |
| sex | −0.25 | $<10^{-5}$ |
| achieve | 0.26 | $<10^{-10}$ |
| religion | 0.12 | 0.001 |
| death | −0.039 | 0.2 |
| swear | −0.34 | $<10^{-5}$ |

Age

To examine the relationship between age and the different metrics, separate linear regression models were built with each dimension as the dependent variable and character age as the independent variable. Table 7 reports regression coefficients for age along with p values for each dimension. The positive coefficient for age of acquisition indicates an increase in sophistication of word usage with age. Arousal, on the other hand, has a significant negative coefficient indicating a decrease in activation, on average, as character age increases. Gender ladenness also has a significant negative coefficient indicating that as age increases, the average gender ladenness value decreases. Similar trends are observed for sexuality and swear word usage. Usage of words related to achievement and religion however, seem to increase with age.

Character Network Analytics

To study differences in major roles assigned to the different subgroups, two centrality metrics were computed from the character network graph constructed for each movie: degree centrality measures the number of unique characters that interact with a given character, betweenness centrality measures how much would the plot be disrupted if said character was to disappear completely, i.e., how important is a character to the overall plot. Similar to the language analyses from previous section, differences in these metrics were tested along the three factors of gender, race and age. All statistical tests reported below are conducted at $\alpha=0.05$.

Gender

Male characters were found to have higher values in the two metrics compared to female characters but the differences were not statistically significant. Motivated by studies (Sapolsky et al., 2003; Linz et al., 1984) which report interactions between genre and gender, Mann-Whitney U tests were performed between male and female characters given different genres. To avoid type I errors, multiple comparisons were corrected for using the Holm-Bonferroni correction. Significant differences were found only in horror movies where the median degree centrality for females (0.221) was higher than the median degree centrality of males (0.166). This is in agreement with prior studies which report female characters to have a more prominent presence in horror movies, particularly as victims of violent scenes (Welsh and Brantford, 2009).

Race

To examine differences in major roles across the racial categories, Kruskal-Wallis tests similar to previous subsection were performed. Significant differences were found with both degree and betweenness centrality measures ($p<0.001$; $\alpha=0.05$).

Latino characters were found to have significantly lower degree centralities compared to Caucasian and south Asian races suggesting non-central roles in these characters. Caucasian characters were found to have median betweenness centralities significantly higher than at least one other race. Characters from the Native American race exhibit significantly lower medians in both degree and betweenness centralities than Caucasian, African and mixed characters, which agrees with (Rosenthal, 2012).

Age

The effects of age on importance of character roles were investigated by building a linear regression model on the two centralities with age as the independent variable. In both cases, age was found to be significant ($p<0.001$; $\alpha=0.05$). With degree centrality, the regression coefficient $\beta$ was found to be equal to 0.003. In betweenness centrality, the regression coefficient was also positive, given by $\beta=8.41\times 10^{-4}$. Both these metrics indicate a positive correlation for character importance with age, i.e. as characters age, there is an increased interaction with other characters in the movie as well as higher prominence in the movie plot.

CONCLUSION

The embodiments and examples set forth above present a scalable automated analysis of differences in character portrayal along multiple factors such as gender, race and age using word usage, psycholinguistic and graph theoretic measures. Several interesting patterns are revealed in the analysis. In particular, movies with female writers and directors in the production team are observed to have balanced gender ratios in characters compared to male writers/directors. Across several races, female actors are found to be younger than male actors on average.

Female characters appear to be more positive in language use with fewer references to death and fewer swear words compared to male characters. Female characters also appear to be more prominent in horror movies compared to male characters. Latino and mixed-race characters appear to have higher usage of sexual words. East Asian characters seem to use significantly fewer religious words. As characters aged, their word sophistication seems to increase along with usage of words related to achievement and religion; there was also a significant reduction in word activation, usage of sexual and swear words as character age increases.

Future work includes expanding the analyses to non-English movies and combining the linguistic metrics with character networks. Specifically, character network edges can be weighted using the psycholinguistic metrics to analyze the emotional patterns in inter-character interactions While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

REFERENCES

Ricardo Alberich, Joe Miro-Julia, and Francesc Rossello. 2002. Marvel universe looks almost like a real social network. arXiv preprint condmat/0202174.

Elizabeth Behm-Morawitz and Dana E Mastro. 2008. Mean girls? the influence of gender portrayals in teen movies on emerging adults' gender-based attitudes and beliefs. Journalism & Mass Communication Quarterly 85(1):131-146.

Harry M Benshoff and Sean Griffin. 2011. America on film: Representing race, class, gender, and sexuality at the movies. John Wiley & Sons.

Andrew Beveridge and Jie Shan. 2016. Network of thrones. Math Horizons 23(4):18-22.

Anthony Bonato, David Ryan D'Angelo, Ethan R Elenberg, David F Gleich, and Yangyang Hou. 2016. Mining and modeling character networks. In Algorithms and Models for the Web Graph: 13th International Workshop, WAW 2016, Montreal, QC, Canada, Dec. 14-15, 2016, Proceedings 13. Springer, pages 100-114.

Gavin S Cape. 2003. Addiction, stigma and movies. Acta Psychiatrica Scandinavica 107(3):163-169. James M Clark and Allan Paivio. 2004. Extensions of the paivio, yuille, and madigan (1968) norms. Behavior Research Methods, Instruments, & Computers 36(3):371-383.

William Cohen, Pradeep Ravikumar, and Stephen Fienberg. 2003. A comparison of string metrics for matching names and records. In Kdd workshop on data cleaning and object consolidation. volume 3, pages 73-78.

DailyScript. 2017. The daily script. [Online; accessed 1 Feb. 2017]. http://dailyscript.com/.

Paul G Davies, Steven J Spencer, and Claude M Steele. 2005. Clearing the air: identity safety moderates the effects of stereotype threat on women's leadership aspirations. Journal of personality and social psychology 88(2):276.

Tony Dimnik and Sandra Felton. 2006. Accountant stereotypes in movies distributed in north America in the twentieth century. Accounting, Organizations and Society 31(2):129-155.

Alice H Eagly and Steven J Karau. 2002. Role congruity theory of prejudice toward female leaders. Psychological review 109(3):573. ethnicelebs.com. 2017. Celebrity ethnicity. [Online; accessed 1 Feb. 2017]. http://ethnicelebs.com.

Louis August Gottschalk and Goldine C Gleser. 1969. The measurement of psychological states through the content analysis of verbal behavior. Univ of California Press.

Mark Hedley. 1994. The presentation of gendered conflict in popular movies: Affective stereotypes, cultural sentiments, and men's motivation. Sex Roles 31(11-12): 721-740.

Bell Hooks. 2009. Reel to real: race, class and sex at the movies. Routledge. IMDb. 2017. Internet movie database. [Online; accessed 1 Feb. 2017]. http://www.imdb.com/. IMSDb. 2017. Internet movie script database. [Online; accessed 1 Feb. 2017]. http://www.imsdb.com/.

Anne E Lincoln and Michael Patrick Allen. 2004. Double jeopardy in hollywood: Age and gender in the careers of film actors, 1926-1999. In Sociological Forum. Springer, volume 19, pages 611-631.

Daniel Linz, Edward Donnerstein, and Steven Penrod. 1984. The effects of multiple exposures to filmed violence against women. Journal of Communication 34(3): 130-147.

Ting Liu, Kit Cho, George Aaron Broadwell, Samira Shaikh, Tomek Strzalkowski, John Lien, Sarah M Taylor, Laurie Feldman, Boris Yamrom, NickWebb, et al. 2014. Automatic expansion of the mrc psycholinguistic database imageability ratings. In LREC. pages 2800-2805.

Francois Mairesse, Marilyn A Walker, Matthias R Mehl, and Roger K Moore. 2007. Using linguistic cues for the automatic recognition of personality in conversation and text. Journal of artificial intelligence research 30:457-500.

Nikolaos Malandrakis and Shrikanth S Narayanan. 2015. Therapy language analysis using automatically generated psycholinguistic norms. In INTERSPEECH. pages 1952-1956.

Finn Amp Nielsen. 2011. A new anew: Evaluation of a word list for sentiment analysis in microblogs. arXiv preprint arXiv: 1103.2903.

David Niven. 2006. Throwing your hat out of the ring: Negative recruitment and the gender imbalance in state legislative candidacy. Politics & Gender 2(04):473-489. NYFA. 2013. Gender inequality in film. [Online; accessed 1 Feb. 2017]. https://www.nyfa.edu/film-school-blog/genderinequality-in-film/.

James W Pennebaker, Ryan L Boyd, Kayla Jordan, and Kate Blackburn. 2015. The development and psychometric properties of liwc2015. Technical report.

James W Pennebaker, Matthias R Mehl, and Kate G Niederhoffer. 2003. Psychological aspects of natural language use: Our words, our selves. Annual review of psychology 54(1):547-577.

Polygraph. 2016. Film dialogue from 2,000 screenplays, broken down by gender and age. [Online; accessed 1 Feb. 2017]. http://polygraph.cool/films/.

Anil Ramakrishna, Nikolaos Malandrakis, Elizabeth Staruk, and Shrikanth S Narayanan. 2015. A quantitative analysis of gender differences in movies using psycholinguistic normatives. In EMNLP. pages 1996-2001.

Mauricio Aparecido Ribeiro, Roberto Antonio Vosgerau, Maria Larissa Pereira Andruchiw, and Sandro Ely de Souza Pinto. 2016. The complex social network of the lord of rings. Revista Brasileira de Ensino de Fisica 38(1).

Nicolas G Rosenthal. 2012. Reimagining Indian country: Native American migration and identity in twentieth-century Los Angeles. Univ of North Carolina Press.

Burry S Sapolsky, Fred Molitor, and Sarah Luque. 2003. Sex and violence in slasher films: Reexamining the assumptions. Journalism & Mass Communication Quarterly 80(1):28-38.

Stacy L Smith, Marc Choueiti, and Katherine Pieper. 2014. Gender bias without borders: An investigation of female characters in popular films across 11 countries. USC Annenberg 5.

Shinya Tanaka, Adam Jatowt, Makoto P Kato, and Katsumi Tanaka. 2013. Estimating content concreteness for finding comprehensible documents. In Proceedings of the sixth ACM international conference on Web search and data mining. ACM, pages 475-484.

Tom F M Ter Bogt, Rutger CME Engels, Sanne Bogers, and Monique Kloosterman. 2010. "shake it baby, shake it": Media preferences, sexual attitudes and gender stereotypes among adolescents. Sex Roles 63(11-12): 844-859.

Danny Wedding and Mary Ann Boyd. 1999. Movies & mental illness: Using films to understand psychopathology.

Andrew Welsh and Laurier Brantford. 2009. Sex and violence in the slasher horror film: A content analysis of gender differences in the depiction of violence. Journal of Criminal Justice and Popular Culture 16(1):1-25.

Bo Xiao, Zac E Imel, Panayiotis G Georgiou, David C Atkins, and Shrikanth S Narayanan. 2015. "rate my therapist": Automated detection of empathy in drug and alcohol counseling via speech and language processing. PloS one 10(12): e0143055.

What is claimed is:
1. A computer system including a computer processor, the computer processor operable to:

receive at least one or a plurality of narrative files formatted in human readable format, each narrative file including a script and/or dialogues, the script and/or dialogues being tagged with character names along with auxiliary information, each script and/or dialogues including a plurality of portrayals performed by an associated actor;

determine linguistic representations of content of the narrative files in both abstract and semantic forms;

connect the linguistic representations to higher order representations and mental states;

connect the linguistic representations to behavior and action;

analyze interplay between language constructs and demographics of content creators;

adapt content representations towards individuals/groups to reflect heterogeneity in preferences;

parse screenplay files or other narrative files to extract predetermined relevant information to output utterances and character names associated with the output utterances;

identify similar movies or stories as a plurality of potential matches;

form movie or story alignments by computing name alignment scores for each match as a percentage of character names from the narrative files for each of the similar movies or stories;

identify target entries as movies or stories having an alignment score higher than a predetermined value;

collect demographics including age, gender, sex, education, profession, and race data for each associated actor; and determine differences in portrayal of characters.

2. The computer system of claim 1 wherein each narrative file is a screenplay file or any story document with one or more characters, description of their actions, and a narrative that represents their interaction with one another.

3. The computer system of claim 1 wherein multiple levels connect words, emotion, and personality traits.

4. The computer system of claim 1 wherein the behavior and action include humor, violence, aggression, language sophistication, gender, ladenness of language use, and combinations thereof.

5. The computer system of claim 1 wherein character names are mapped by term frequency-inverse document frequency to compute the name alignment scores.

6. The computer system of claim 1 wherein similar movies are identified that have a close match with a predetermined screenplay name.

7. The computer system of claim 1 wherein the computer processor is further operable to determine biases in the portrayals with respect to age, gender, and race.

8. The computer system of claim 1 wherein the auxiliary information includes shot location (interior/exterior), character placement and scene context.

9. The computer system of claim 1 wherein each screenplay file or other narrative file are from a diverse set of writers and include a significant amount of noise and inconsistencies in their structure.

10. The computer system of claim 1 wherein the computer processor is further operable to fetch metadata for each parsed movie.

11. The computer system of claim 10 wherein the metadata is selected from the group consisting of year of release, directors, writers, producers, performers, and other creators of content and combinations thereof.

12. The computer system of claim 1 wherein the computer processor is further operable to identify a gender for actors and other members of a production team found in a movie.

13. The computer system of claim 1 wherein portrayal differences are measured by psycholinguistic normatives that capture an underlying emotional state of a speaker, the psycholinguistic normatives providing a measure of emotional and psychological constructs of a speaker, the psycholinguistic normatives being computed entirely from language usage.

14. The computer system of claim 13 wherein emotional and psychological constructs include arousal, valence, concreteness, and intelligibility.

15. The computer system of claim 14 wherein a normative score for each of the psycholinguistic normatives is extrapolated from a small set of keywords which are annotated by psychologists, the normative score being computed on content words from each dialog.

16. The computer system of claim 15 wherein the normative score for an input word is determined by linear regression from $$r(w)=\theta_0+\Sigma\theta_i \cdot sim(w,s_i) \qquad (1)$$

where:
w is an input the input word;
si is a concept word;
r(w) is a computed normative score for word w; and
$\theta_0$ and $\theta_i$ are regression coefficients; and
sim is similarity between input word w and concept words si.

17. The computer system of claim 1 wherein portrayal differences are measured by Linguistic Inquiry and Word Counts tool (LIWC) which provide a measure of a speaker's affinity to different predetermined social and physical constructs, processes raw text and outputs percentage of words from a script that belong to a predetermined dimension.

18. The computer system of claim 17 wherein the predetermined dimension includes a dimension selected from the group consisting of linguistic, affective, and perceptual constructs.

19. The computer system of claim 18 wherein degree centrality is employed, degree centrality being the number of edges incident on a node.

20. The computer system of claim 1 wherein the computer processor is further operable to:
construct a network structure of interactions between characters where importance measures for each character are computed by constructing an undirected and unweighted graph where nodes represent characters;
placing an edge $e_{ab}$ to represent interactions between two characters in terms of quality and quantity; and
analyzing properties of a node and/or edge statically or over time; and
determining taxonomy of media content using character temporal and global network structures.

21. The computer system of claim 20 further comprising creating personalizations from the network structure.

22. The computer system of claim 20 wherein quantity access interaction between characters using weight of an edge as number of dialogues, words exchanged, and other nonverbal cues exchanged.

23. The computer system of claim 20 wherein quality access interaction between characters using weight of an edge from linguistic representations.

24. The computer system of claim 20 wherein quality access interaction between characters using weight of an edge from interactions conditioned on predetermined features such as demographics, education level, and combinations thereof.

25. The computer system of claim 20 further comprising determining the taxonomy of media content from the network structure conditioned on demographics.

26. The computer system of claim 20 wherein the computer processor is further operable to create personalizations from using networks conditioned on demographics.

27. The computer system of claim 20 further comprising evaluating effects of addition, deletion, and/or substitution of nodes and/or edges can in disrupting a movie plot.

28. The computer system of claim 20 wherein the computer processor is further operable to estimate measures of a node's importance as proxy for a character's importance.

29. The computer system of claim 20 further comprising placing the edge $e_{ab}$ if two characters A and B interact at least once in the script and/or dialogues wherein characters A and B interacts at least one scene in which one speaks right after another.

30. The computer system of claim 29 wherein betweenness centrality is employed, betweenness centrality being the number of shortest paths that go through a node.

31. The computer system of claim 1 wherein the computer processor is further operable to determine societal impact, commercial impact, policy impact, voting impact, buying impact, and combinations thereof.

* * * * *